United States Patent [19]

Becka et al.

[11] Patent Number: 4,561,139
[45] Date of Patent: Dec. 31, 1985

[54] MACHINE FOR AUTOMATICALLY ROUGHING THE CEMENT MARGIN OF A FOOTWEAR UPPER ASSEMBLY

[75] Inventors: Michael M. Becka, Nashua; William G. Goodenough, West Swanzey, both of N.H.

[73] Assignee: International Shoe Machine Corporation, Nashua, N.H.

[21] Appl. No.: 572,349

[22] Filed: Jan. 20, 1984

[51] Int. Cl.⁴ .................... A43D 95/00; C14B 01/44
[52] U.S. Cl. .................................. 12/1 R; 12/17.2; 69/6.5
[58] Field of Search .............. 69/6.5; 12/1 R, 1 A, 12/17.2, 77, 57.6

[56] References Cited

U.S. PATENT DOCUMENTS

| | | | |
|---|---|---|---|
| 3,843,985 | 10/1974 | Leonhardt | 12/1 R |
| 3,975,932 | 8/1976 | Vornberger | 69/6.5 |
| 4,020,660 | 5/1977 | Bergeron | 69/6.5 |
| 4,090,378 | 5/1978 | Sommer | 69/6.5 |
| 4,134,278 | 1/1979 | Becka | 69/6.5 |
| 4,167,103 | 9/1979 | Becka | 69/6.5 |
| 4,391,011 | 7/1983 | Peck et al. | 69/6.5 |
| 4,391,012 | 7/1983 | Becka | 12/10.5 |

OTHER PUBLICATIONS

"Automatic Bottom Roughening Machine Model C" Bulletin 983, International Shoe Machine Corp.

Primary Examiner—Werner H. Schroeder
Assistant Examiner—Steven N. Meyers
Attorney, Agent, or Firm—Robert Shaw

[57] ABSTRACT

A machine for automatically roughing the cement margin of a footwear upper assembly. The machine includes means for supporting the footwear upper assembly by a mechanism capable of applying to the upper assembly rocking movement, translational movement and rotational movement. A roughing tool is provided, as well as means for applying a combination movement to the upper assembly. Simultaneously, roughing is effected along the shoe margin by the roughing tool. The combination of movements serves continuously to present a new roughing surface to the roughing tool in the course of roughing, resulting in uniformity of roughing. The rotational movement serves to cause the roughing tool to track the cement margin with a determined orientation therebetween as the cement margin moves past the roughing portion of the roughing tool.

31 Claims, 13 Drawing Figures

MACHINE FOR AUTOMATICALLY ROUGHING THE CEMENT MARGIN OF A FOOTWEAR UPPER ASSEMBLY

BACKGROUND OF THE INVENTION

The present invention relates to machines for roughing the cement margin of a shoe or other footwear upper assembly.

By way of background attention is called to U.S. Pat. Nos. 3,843,985 (Leondhardt); 3,975,932 (Vornberger); 4,020,660 (Bergeron); 4,090,378 (Sommer); and 4,167,103 (Becka); each of which discloses a roughing machine for roughing the margin of a shoe or other footwear assembly.

In the course of shoe making a shoe (or other footwear) upper is mounted upon a last having an insole upon its bottom, the upper margin being draped over the last and stretched in the manner shown in the U.S. Pat. No. 4,391,012 (Becka), for example; an adhesive is thereafter applied to the margin of the upper which is then wiped to secure the margin to the bottom of the insole to form a footwear upper assembly. Later the margin of the upper assembly is roughed, mostly manually even now, for later application of an outer sole. The patents listed in the previous paragraph and others represent efforts in the shoe machinery industry to provide roughing machines that emulate the manual roughing operation, and do it better and more economically; however the change from manual to automatic is very difficult.

The bottom of a shoe upper assembly in plan view is irregular and characterized by a number of rather abrupt changes in shape. Also, the shoe assembly bottom typically is not planar, nor is there uniformity of contour gradient laterally from the edge of the insole inwardly toward its longitudinal axis (i.e., the crown). In addition shoe bottoms have abrupt longitudinal contour gradients from toe to heel. Any automatic roughing machine must follow those contour gradients while nevertheless achieving roughing of the cement margin in an expeditious fashion. Furthermore, roughing of the margin only must be accomplished, since any slippage onto the side of the upper will ruin the shoe, except those that require side roughing.

Accordingly, it is an objective of the present invention to provide a machine for automatically roughing (i.e., a roughing machine) the cement margin of a footwear upper assembly to remove therefrom the smooth outer surface of leather or synthetic material and thereby enhance bonding of the footwear assembly to an outer sole.

Another objective is to provide a roughing machine that addresses the problems above.

Another objective is to provide a roughing machine that performs the roughing function quickly, effectively and accurately.

Still another objective is to provide a roughing machine whose mechanical structures can be interfaced with the fast-developing electronic devices.

These and still further objectives are addressed hereinafter.

The foregoing objectives are achieved, generally, in a machine for automatically roughing the cement margin of a footwear upper assembly, that includes a support to receive the footwear upper assembly, which ssupport is capable of rocking movement, translational movement and rotational movement; drive means connected to drive the support to achieve the rocking movement, translational movement and rotational movement of the support; a roughing tool mounted to move relative to the footwear upper assembly and operable to achieve roughing of the cement margin as the cement margin moves relative to the roughing tool in the course of the rocking movement, translational movement and rotational movement; and sensing means to provide feedback signals to control the drive means which, on the basis of the feedback signals, acts to maintain a determined orientation between the roughing tool and the footwear upper assembly in the course of relative motion between the two.

The invention is hereinafter described with reference to the accompanying drawing in which.

DESCRIPTION OF THE INVENTION

Figure 1:
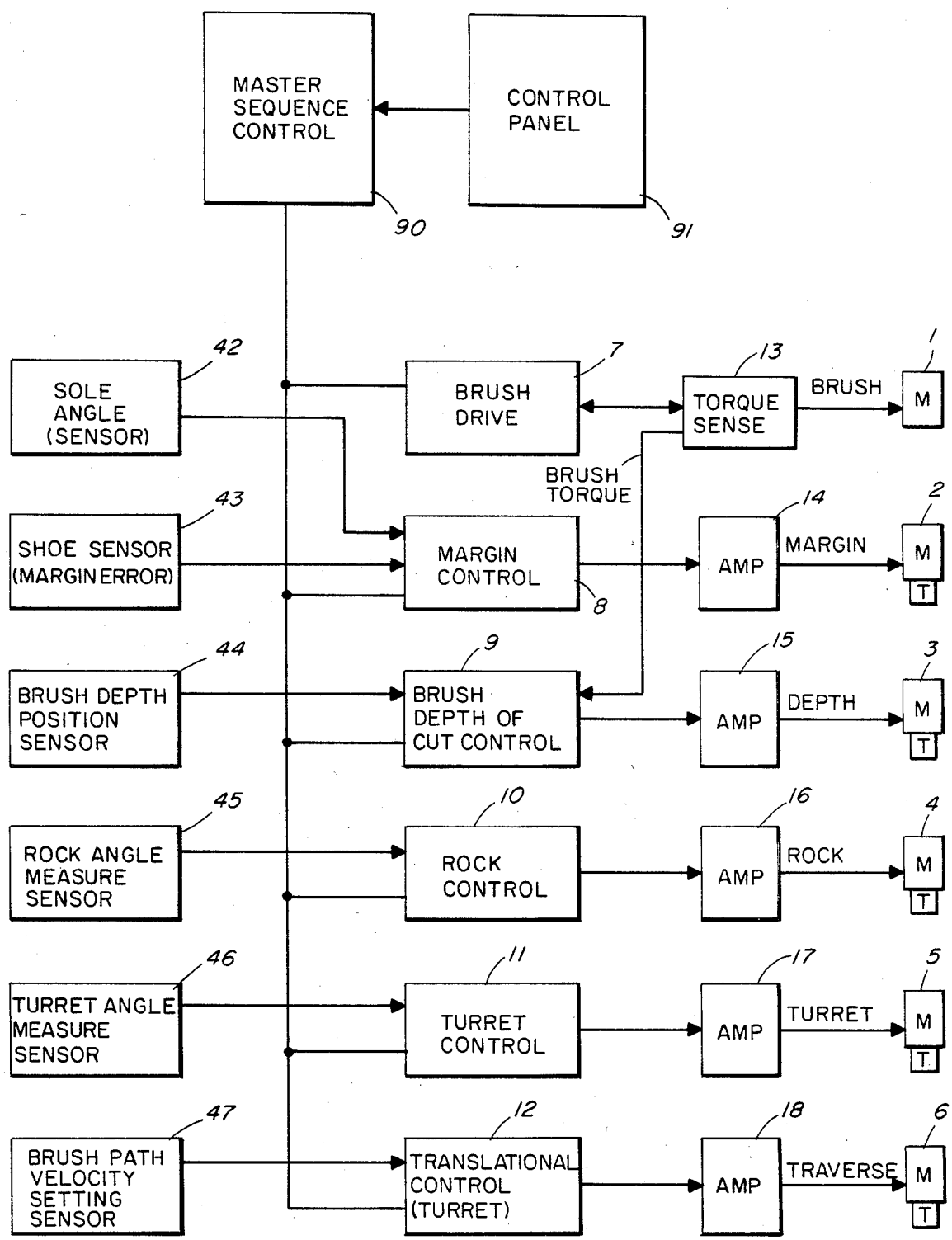
FIG. 1 is a diagrammatic representation of electrical and mechanical interacting elements of a machine for automatically roughing the cement margin of a footwear upper.
Figure 2:
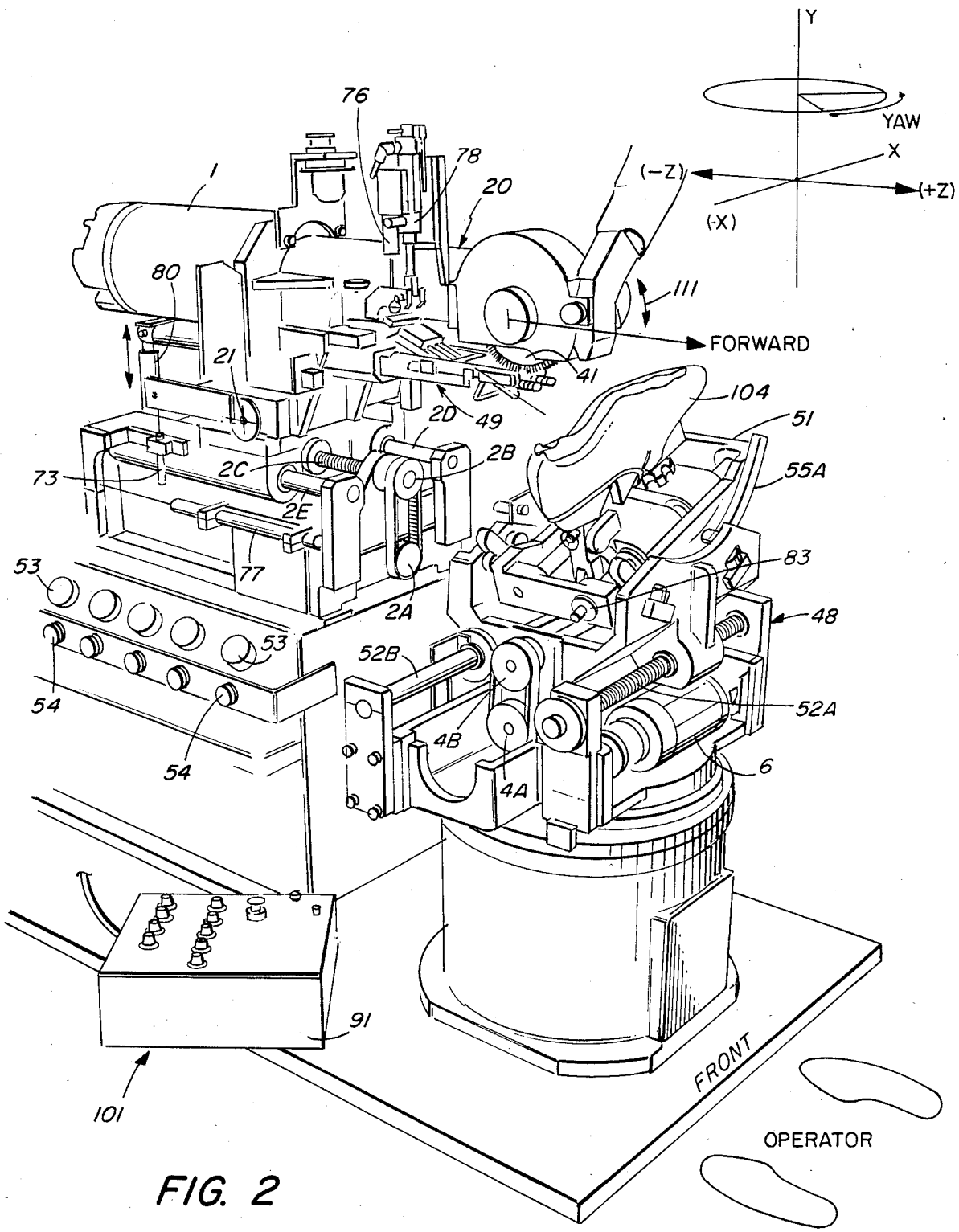
FIG. 2 is an isometric view of a roughing machine embodying the elements shown diagrammatically in FIG. 1.
Figure 3:
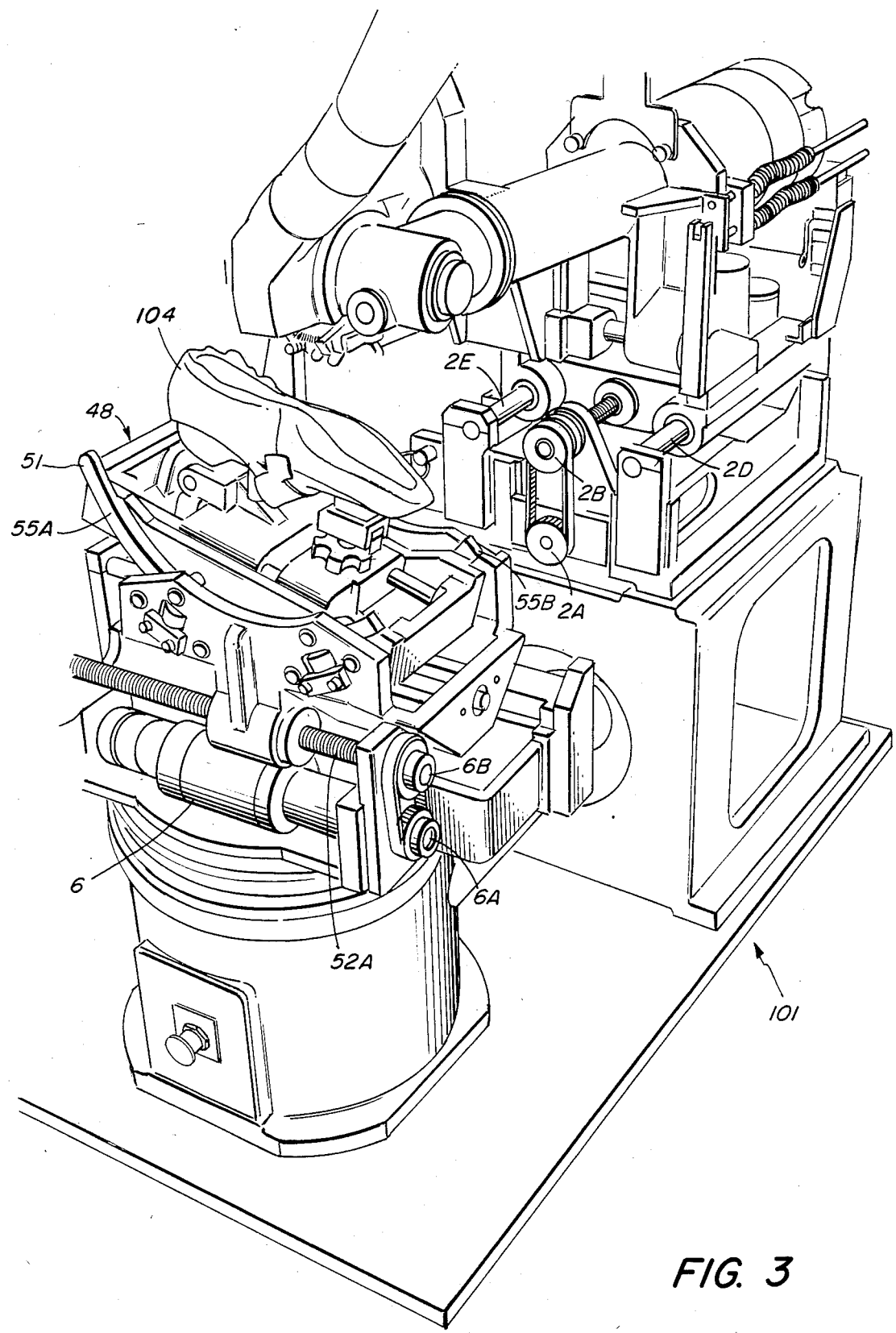
FIG. 3 is another isometric view of the machine in FIG. 2.
Figure 4:
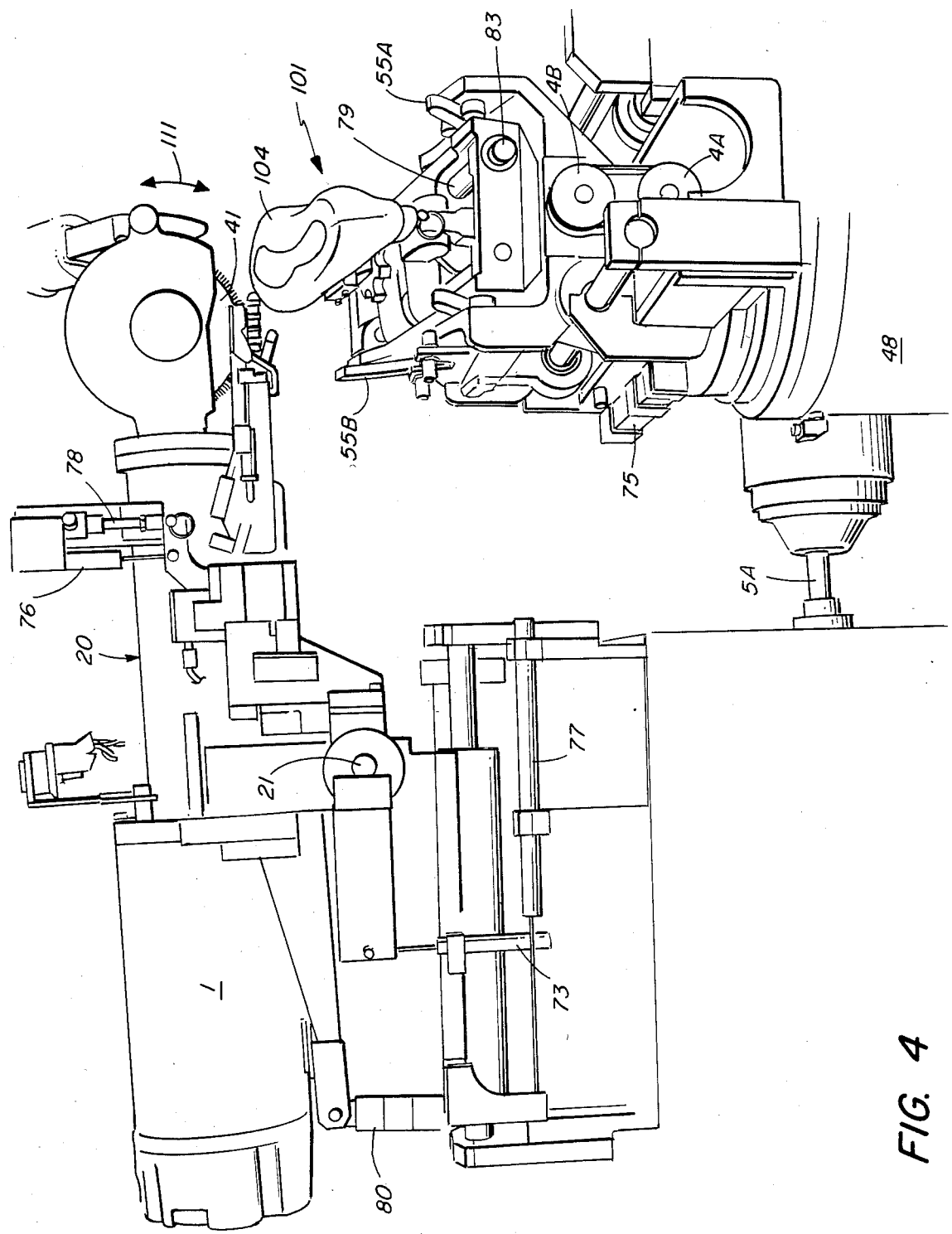
FIG. 4 is still another isometric view of the machine in FIG. 2.

Referring to figures, the machine shown at 101 in FIGS. 2–4 is one that automatically roughs the cement margin 103 of a footwear upper assembly 104 in FIGS. 5–8 in the manner discussed hereinafter. The machine operator is intended to stand facing the machine (i.e., looking in the minus Z-direction in FIG. 2). Machine parts closest to the operator are considered to be at the front of the machine 101 and machine parts furthest from the operator are considered to be at the back of the machine. Parts moving toward the operator are considered to have forward movement and parts moving away from the operator are considered to have rearward movement. It is shown later that the upper assembly 104, in the course of roughing, rotates about a vertical yaw-axis (i.e., the Y-axis in the figures), it is subjected to translational movement (i.e., motion in the X-direction) and it is subjected to rocking movement (as indicated by the double-arrow 107 in FIG. 5) about a Z-axis between the heel portion and the toe portion of the assembly 104. The machine 101 is now discussed in detail; in the discussion an attempt is made to point out the actual structures in FIGS. 2-13 that correspond to the block elements in FIG. 1.

Figure 5:
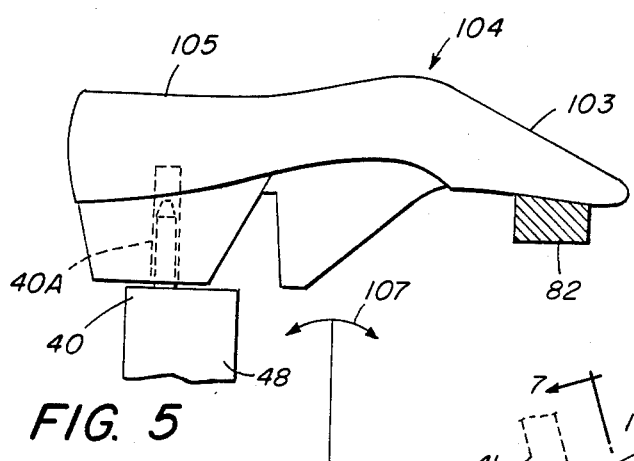
FIG. 5 is a side view of a footwear upper assembly and a few parts of the roughing machine in FIG. 2.
Figure 6:
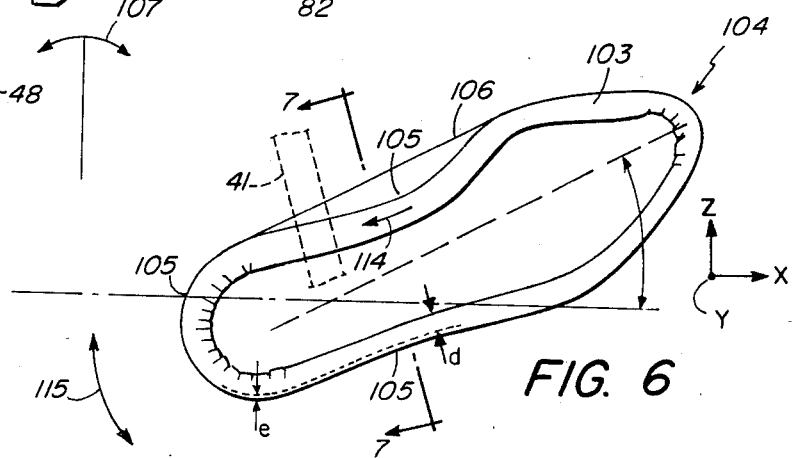
FIG. 6 is a plan view of the upper assembly of FIG. 5 plus a small part of a roughing tool, the upper assembly being rotated counter clock-wise through about 30 degrees from the position shown in FIG. 5.

The roughing machine 101, as above indicated, serves to abrade the surface of the cement margin 103 (in FIG. 6) to provide enhanced bonding surface when an outer sole is later adhesively attached to the upper assembly. The margin 103, as shown in FIG. 6, is irregular in shape in the X-Z plane. Its contour in the X-Y plane, as shown in FIG. 5, is also irregular; also the sides of the upper assembly 104 present continuously differing surfaces to the various sensors, as below noted, introducing additional problems. In the operation, in preferred form, the upper assembly 104 is rotated through 360 degrees to achieve roughing of one assembly 104 which is then removed; the next upper assembly is installed and rotation is again 360 degrees, but in the reverse direction.

The assembly 104 is received by a support 51 on a turret 48. The support 51 (as later explained) achieves rocking movement, rotational movement and translational movement by action of servomotors 4, 5, and 6, respectively. Some of the servomotors 4, 5, 6 and other similar servomotors are within the machine 101 in FIGS. 2-4, but their drive mechanisms can be seen; e.g., the motor 4 is within the turret 48, but it drives a sheave 4A which drives a sheave 4B which drives a threaded shaft secured to a linkage to effect rocking. A similar approach is used with respect to other drives. Roughing of the cement margin 103 is effected by a roughing tool 41 which, in the preferred embodiment, is a rotatable wire brush in the form of a disc whose plane of rotation (i.e., the Y-Z plane in the figures) is essentially vertically oriented and whose periphery or peripheral surface 41A in FIG. 7 contacts the cement margin and roughs the same in the course of translational and other movement of the assembly 104 along a path that is essentially orthogonal to the axis of turret rotation (i.e., the Y-axis). A most important aspect of the present invention is the need to maintain a determined orientation between the roughing tool 41 and the footwear upper assembly 104 in the course of relative motion between the two, that determined orientation being such that the orientation between the roughing tool and the edge of the upper labeled 105 in FIG. 6 between the cement margin 103 and the side of the upper designated 106 is maintained by rotational movement of the turret 48, as explained below. In this way orientation of the brush 41 is maintained perpendicular to the edge 105 regardless of the position of the shoe assembly. (The edge 105, as shown in FIG. 6 and elsewhere is irregular in direction and it is linear at some places and curved in others along its closed-loop path or track; it will be understood in the explanation herein that the brush 41, or the plane of the disc-shaped brush, is maintained perpendicular to the edge 105 where the edge is linear and to the tangent to that edge where the edge is curved.)

Control of the servomotors 4, 5, and 6, and further servomotors 2 and 3, is accomplished by a controller consisting of electrical controllers 8-12 in FIG. 1 that act through amplifiers 14-18, respectively. Feedback control signals to achieve present purposes come from combination mechanical-electrical sensors 42-47. The feedback signals are generated mostly by mechanical movement which is converted to an electrical signal by a potentiometer, for example. A particular sensor, then, consists of a mechanical follower or the like and a potentiometer or the like driven thereby. The brush 41 is driven by a DC motor 1 whose speed is controlled by interaction between a brush drive 7 and a torque sense 13.

Figure 9:
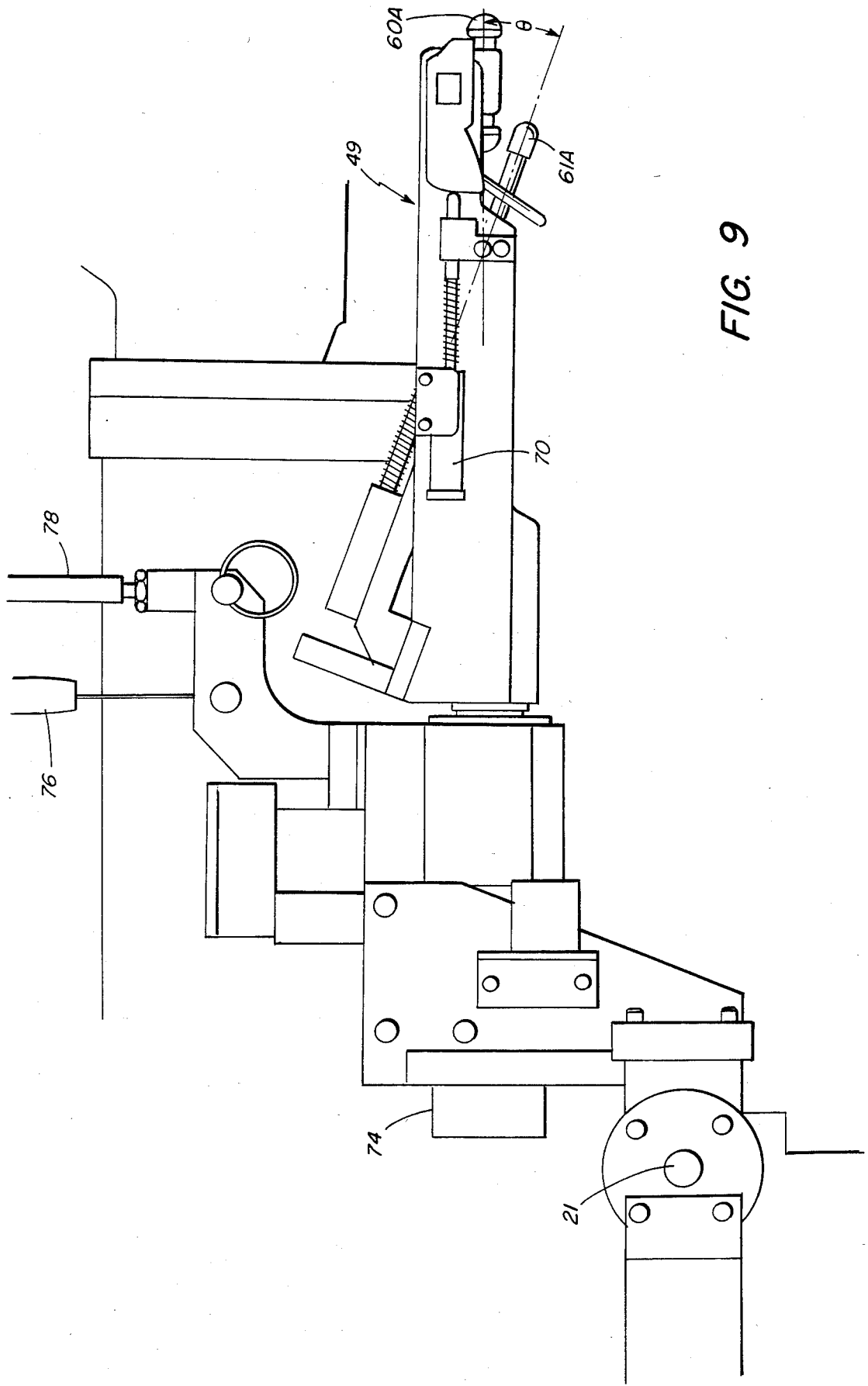
FIG. 9 is a side view of a portion of the machine in FIG. 2, showing various sensors in a sensor arm assembly with the multiple sensors to provide feedback signals to control positioning between the roughing tool and the shoe upper assembly.
Figure 12:
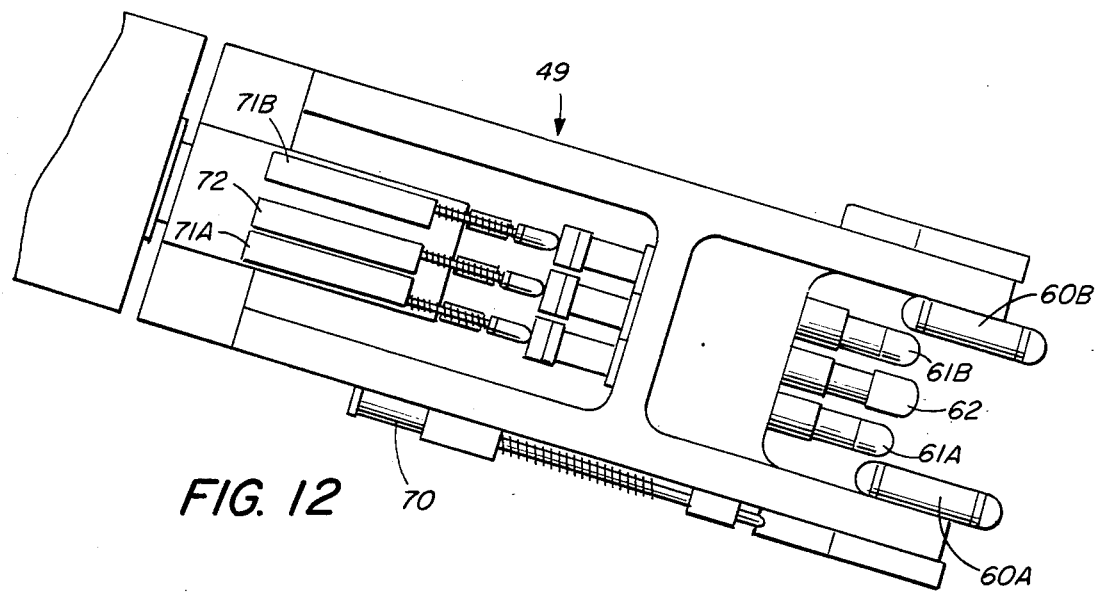
FIG. 12 is a plan view of a portion of the sensor arm in FIG. 9.
Figure 13:
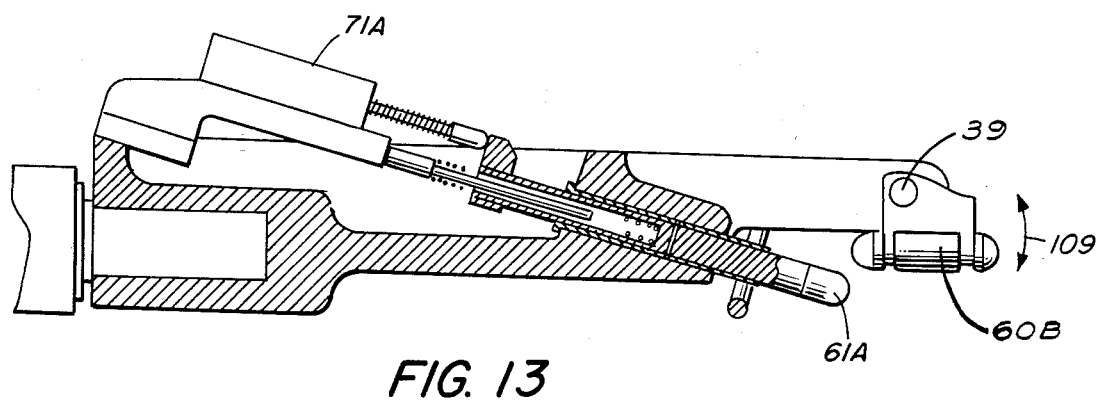
FIG. 13 is a side view, partly cutaway, of the portion of the sensor arm shown in FIG. 12.

It may be helpful at this juncture to describe what is included in the sensors 42-47, the various elements being taken up in detail later. The sole angle sensor 42 consists of a pair of rollers 60A and 60B (FIG. 11) that pivot at 39 in FIG. 13 (see double arrow 109) to actuate a potentiometer 70 (FIG. 12). The shoe sensor (margin error) 43 consists of a middle finger 62 that actuates a potentiometer 72 in FIG. 12. The brush position error sensor 44 consists of a potentiometer 73 in FIG. 4 which is actuated by pivoting action of the roughing arm labeled 20 in FIG. 4 about a pivot 21 (FIG. 9). The rock angle measure sensor 45 consists of the rollers 60A and 60B that rotate in the direction of the double arrow 110 in FIG. 11 to actuate a rotary potentiometer 74 in FIG. 9. The turret angle measure sensor 46 consists of a pair of outer fingers 61A and 61B in FIG. 11, that move in and out in FIG. 12 to actuate potentiometers 71A and 71B, respectively, in a push-pull mode. The brush path velocity setting sensor 47 includes a linear transducer 75 in FIG. 4, whose output changes in accordance with translational movement of the shoe assembly 104, as discussed later. The linear transducer labeled 76 (FIG. 9) provides signals to indicate position errors between the brush 41 and the sensor arm 49 (FIG. 2). Another linear transducer 77 gives position information for the slide mechanism 20 through the margin control 8.

The rollers 60A and 60B ride upon and apply downward pressure upon the cement margin in the course of relative motion between the two. The downward pressure is provided by an air cylinder 78 in FIG. 9. The two rollers 60A and 60B, one set at each side and in close proximity to the wire-wheel brush 41, follow undulations in the cement margin in the course of the translational movement of the upper assembly 104. The rollers, as discussed later with reference to FIGS. 9-13, are part of the assemblage (or sensor arm) 49 that is free to rotate through a limited angle about its longitudinal axis and provide signals through the potentiometer 74 on the basis of angular position of the assemblage 49 to control the rocking movement of the support 51. The assemblage 49 also pivots at 21 in FIG. 9 to accept downward pressure from the cylinder 78. The rollers 60A and 60B also pivot at 39 within the assemblage 49 (see FIG. 13) to provide, through the potentiometer 70, signals that serve to adjust the transverse depth of the brush (or roughing tool) 41 onto the upper assembly thereby to maintain the edge 105 of the upper assembly away from the portion being roughed; this latter function is needed because the crown shown at 113 in FIG. 7 of the footwear assembly bottom differs from shoe to shoe; in the absence of the positional correction of the brush 41, there would, in some situations, be a biting into the insole during roughing.

The feedback sensors also include the pair of spaced outer fingers 61A and 61B (FIG. 11) that provide turret angular information, in the form of a differential signal, with respect to angular orientation (in the X-Z plane) of the upper assembly 104 relative to the steel-wire brush 41 to permit control of the rotational movement, theereby to achieve the necessary determined orientation between the wire brush 41 and the upper assembly 104, as now explained. The finger sensors 61A and 61B move, in the course of roughing, in what may be properly characterized as a push-pull mode of operation; generally, but not always, when the finger 61A extends toward the upper assembly, the finger 61B retracts, and vice versa. The finger sensors 61A and 61B are mechanically coupled to the potentiometers 71A and 71B, respectively, in FIG. 12. The potentiometers 71A and 71B, in turn, provide electrical feedback signals to control the servomotor 5 that drives the turret 48 in rotation about its vertical Y-axis. The aim here is to have the plane of rotation (which is in an Y-Z plane and hence vertically oriented in the figures) of the disc-shaped wire wheel 41 at all times disposed substantially perpendicular (i.e., normal) to the edge 105 of the upper assembly (see FIG. 6). Said another way, to provide proper roughing, the disc-shaped wheel 41 should always address the cement margin in a direction such that the wheel 41 is about perpendicular to the edge 105 of the upper immediately adjacent the part being roughed. In this way, the cement margin is uniformly roughed irrespective of the particular angular orientation of the turret 48 in the X-Z plane and the periphery or periphery surface 41A of the wheel 41 does not slip down onto the side of the upper.

The feedback sensors also include the middle finger sensor 62 (FIG. 11) which (like the fingers 61A and 61B) moves longitudinaly in and out as the assembly 104 rotates and otherwise moves in the course of roughing. The sensor 62 provides mechanical signals to the potentiometer 72 that provides one of two control signals to the servomotor 2, the other signal coming from the margin sensor 43. The function of the servomotor 2 is to provide transverse movement (i.e., in the Y-Z plane) of the wheel 41 toward and away from the yaw axis (i.e., the Y-axis) of the turret 48 to control the region of contact between the brush periphery 41A and the cement margin 103. The finger sensor or follower 62 is disposed between the pair of fingers 61A and 61B and is adapted to follow along the side 106 of the upper adjacent to (i.e., immediately below) the edge 105 to provide signals to control the transverse position of the region f contact between the wheel 41 and the cement margin 103.

Figure 7:
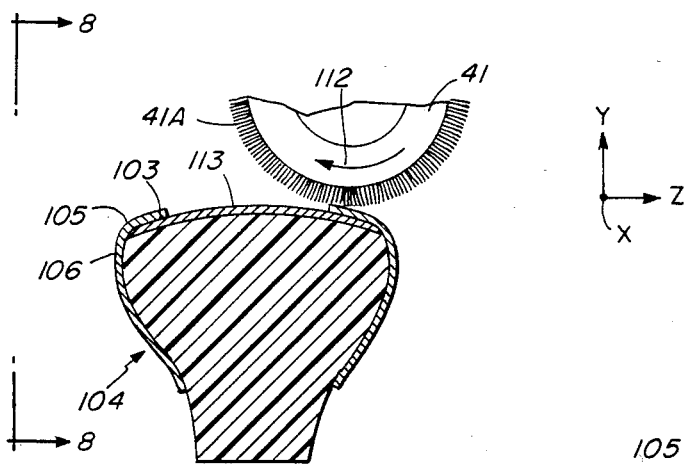
FIG. 7 is a view on the line 7—7 in FIG. 6 looking in the direction of the arrows.
Figure 8:
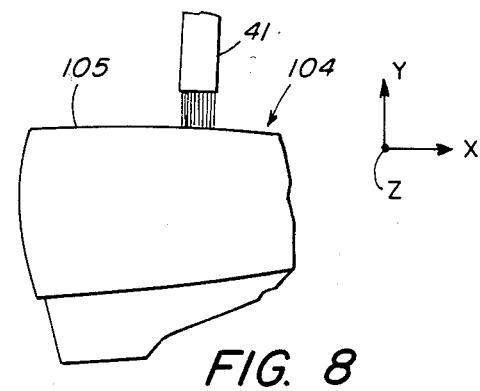
FIG. 8 is a view taken on the line 8—8 in FIG. 7 looking in the direction of the arrows.

As is noted above, the contour of the insole of the assembly 104 varies from shoe to shoe and, in particular, some shoes have a pronounced latitudinal crown (see FIG. 7). In such a situation, the cement margin is often distorted and there is a tendency for the wheel 41 to bite into the material being roughed. That situation can be alleviated by the transverse positioning effected by the servomotor 2, but it can be alleviated further by adjusting the wheel 41 in the Z-direction in FIG. 2 on the basis of signals from the sensor 42. The act of biting into the cement margin 103 can occur also because of unevenness of the margin due to undulations therealong. Relief against this condition (or the other condition just discussed) can be provided by signals from a torque signal of a torque sensor 13 (which may be derived, for example, by sensing the electric current of the DC motor 1 whose current varies as a function of load). The sensor 13 feeds electric signals to control the servomotor 3 (i.e., to effect pivoting of the wheel 41) and to an electrical speed control 7 to change the speed of the DC motor 1 and hence of the roughing wheel 41. A more detailed discussion of the interacting elements of the roughing machine 101, to accomplish the various functions noted above, is given later, but first the assemblage 49 with its various sensors is described with reference to FIGS. 9–13.

A very important aspect of the machine 101 is the configuration of the roller sensors relative to the finger sensors. As is shown in FIG. 9, the longitudinal axis of the rollers 60A and 60B is at an acute angle $\theta$ to the longitudinal axis of the fingers 61A, 61B and 62. The edge 105 of the upper assembly 104 is received within the acute angle $\theta$ thus formed so that the portion of the upper assembly consisting of the cement margin 103 and the side 106 is wedged between the rollers and the fingers (see FIG. 10); the wedging action, in the course of roughing, prevents the rollers 60A and 60B from slipping downward over the edge 105 onto the side 106 of the upper assembly and the fingers 61A, 61B and 62 from slipping upward over the edge 105 onto the cement margin. In this way, the roughing periphery of the wheel 41 truly tracks the cement margin in the course of roughing.

In practice the assemblage 49 is oriented with its longitudinal axis about horizontal, prior to the sensors being in contact with the upper assembly 104, and the rollers 60A and 60B are about horizontal; however, the fingers 61A, 61B and 62 are angled downwardly at about fifteen degrees to form the acute angle $\theta$. When the sensors contact the upper assembly, a number of things happen: the rollers, as they ride along the cement margin 103, tilt in a counterclockwise direction at 39 in FIG. 13 (see double arrow 109) to provide the electrical signals to achieve proper transverse positioning of the wheel 41; they cause the assemblage 49 to rotate about its longitudinal axis (see arrow 110 in FIG. 11) to provide the electrical signals to rock the support 51; and they cause the arm 20 to pivot at 21 in the Y-Z plane in FIG. 2 ( in the direction of the double arrow 111 in FIGS. 2 and 4) to provide electrical signals that control pivoting of the roughing wheel 41. (It should be noted that the pivot 21 is a shaft and that the wheel 41 and the assemblage 49 pivot about the same shaft.) Also, the fingers provide the signals discussed above, all as the upper assembly is moved by the support 51 relative to the roughing wheel 41 in the above-mentioned translational movement, rotational movement and rocking movement. It has been found that movement of the cement margin 103 past the roughing wheel 41 in FIG. 6 in the X-Z plane in the direction of the arrow labeled 114 should be about six inches per second; adjustment of that speed is accomplished by a potentiometer inside control panel 91. Also, as above indicated, the lateral position of the cement margin (whose width is d in FIG. 6 and whose closed path length is a full cycle of movement of the upper assembly 104 in FIG. 6 in the direction of the arrow 114) is maintained by moving the brush 41 toward and away from the crown 113 of the upper assembly; the purpose is to maintain an essentially fixed minimum space e (FIG. 6) between the outer edge of the cement margin 103 and the edge 105 of the upper assembly 104.

Figure 10:
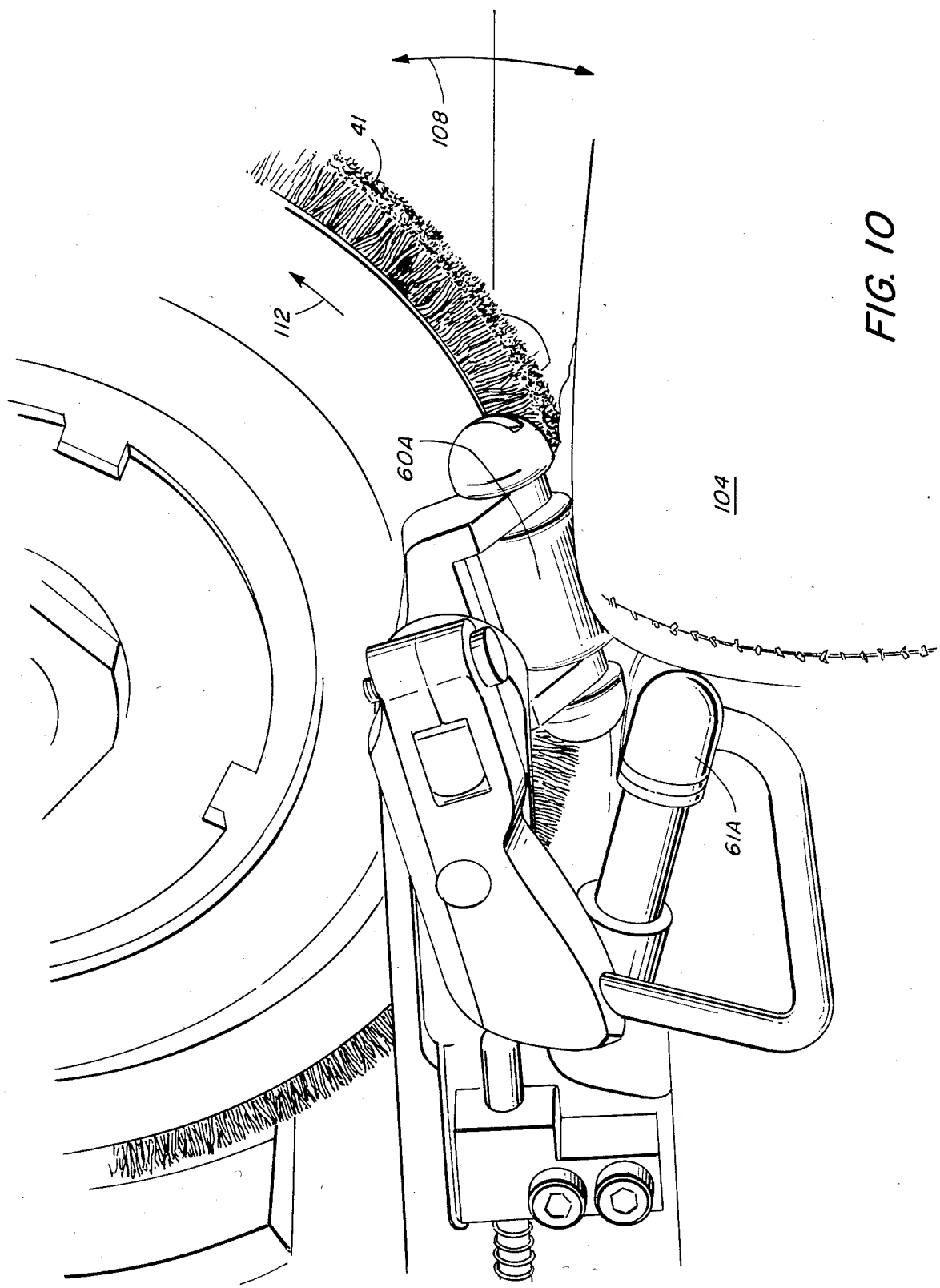
FIG. 10 shows the sensors of FIG. 9 interacting with an upper assembly in the course of roughing.
Figure 11:
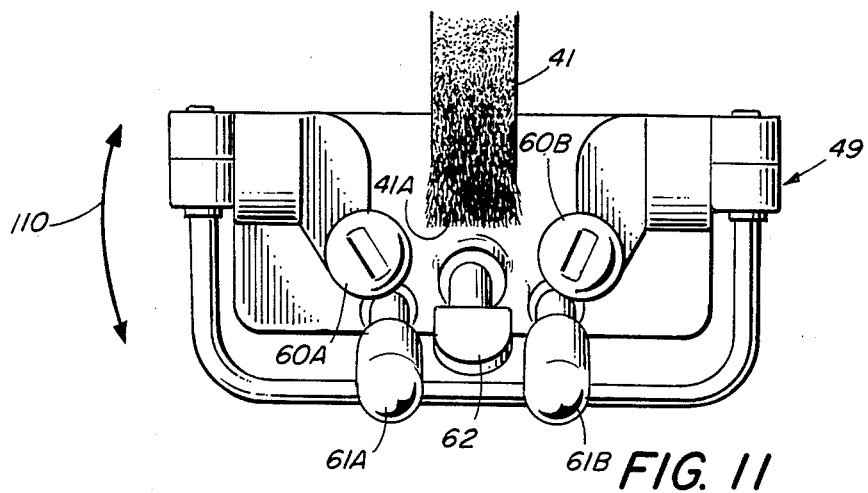
FIG. 11 is a front view of the multiple sensors.

The upper assembly 104 has a thimble hole to receive a cylindrical last pin 40A in FIG. 5, which extends upwardly from a pivot arm or spindle 40 which, in turn, is part of the turret 48 in FIG. 5. The spindle 40 is then pivoted by air pressure in a clockwise direction in FIG. 5 forcing the toe-end of the upper assembly 104 firmly down on a toe-pad 82. (Further downward pressure, as above noted, is applied by the rollers 60A and 60B during roughing.) Once the upper assembly is secured, the roughing wheel 41 is driven by the servomotor 2 forwardly (i.e., in the plus Z-direction in FIG. 2) until the wheel 41 and the sensors 60A, 60B, 61A, 61B, and 62 are appropriately positioned relative to the upper assembly, somewhat as shown in FIG. 10, the initial contact of the wheel 41 being at about the ball portion of the upper. Just before the upper 104 is contacted the wheel is spun in the direction of the arrow labeled 112 in FIG. 7. The various sensors are activated causing the servomotors 4, 6 and 5 respectively to cause the support 51 to achieve rocking movement (so that the cement margin being roughed is at all times essentially parallel to the periphery or peripheral surface 41A in contact therewith), translational movement (so that a different part of the cement margin is continually being presented to the brush 41), and rotational movement (so that the plane of rotation of the wheel 41 is at all times orthogonal to the edge 105 or, said another way, orthogonal to the direction of the path of the cement margin, as represented by the arrow 114 in FIG. 6). With reference to FIGS. 5 and 6, rocking movement (or pitch) is that indicated by the arrow 107 (FIG. 5), translational movement is in the ± X-direction, and rotational movement is that indicated by the arrow 115, such rotation being about a vertical Y or yaw axis disposed between the last pin 40A and the toe pad 82 in FIG. 5. That yaw axis, of course, remains at the center line of the turret 48.

The various movements referred to in the previous paragraphs are effected by the turret 48. The servomotor 5 is geared to the turret 48 (see the shaft labeled 5A in FIG. 4); in one roughing pass it rotates through 360 degrees, but the turret rotation is indexing in nature to present the proper surface for roughing (in fact, at some points in a single cycle of rotation the turret is angularly reversed through small angles of rotation). When a new upper assembly is placed on the spindle 40 the motor 5 is reversed. This removes the need for sliprings for the motors 4 and 6, but it also permits presentation of left and right shoes with the same roughing forces applied to each.

In the course of movement of the upper assembly 104 as just discussed, the wheel 41, as previously indicated, is moved transversely (in the ± z-direction in FIG. 2) by the servomotor 2 along ways 2D and 2E. The motor 2 drives a pulley 2A which drives a pulley 2B which drives a threaded shaft 2C effecting transverse motion of the arm along the slide mechanism just described. The whole mechanism or arm 20 is caused to pivot about the pivot point 21 in FIG. 2 by the servomotor 3, as above noted, to present uniform roughing forces upon the cement margin 103 and to accommodate different crown patterns of the upper being roughed. The latter is accommodated further by the transverse position of the mechanism 20 (and hence the wheel 41) effected by the motor 2.

Roughing at the toe end and the heel end of the assembly 104 differs from roughing at the other parts of the cement margin 103. At the ends the rock signals are turned off and the turret signals are turned off, but the margin-signals are on and the depth signals are on. From a predetermined distance ahead of the toe end and the heel end the roughing wheel follows the arcuate path of the respective end on the assumption that the surface there is essentially flat.

An explanation of the roughing machine automatic sequencing now follows. Sequencing is commenced by an on-off switch in the control panel 91. Starting from a home or initial position, the master sequence control 90 assumes that a (lasted but unsoled) shoe upper assembly 104 has been appropriately mounted on the machine. During the first phase of the sequence, the shoe upper assembly 104 remains stationary while the margin and depth motion axes are operated to extend and lower the brush arm (carrying the shoe sensing apparatus, i.e., the rollers 60A and 60B and the fingers 61A, 61B and 62) until the shoe sensing apparatus acquire shoe attitude and position information and the brush 41 is in close proximity to the upper assembly. Brush rotation is initiated or checked for operation during this phase.

During a second, very brief phase, feedback from the shoe sensors 42–47 is used to adjust shoe attitude and brush position ready to begin roughing. The margin axis is fine adjusted such that, in the next phase, when the brush is lowered against the shoe, the margin of roughing will coincide with the desired cement margin. This relationship of the margin axis is continuously updated through feedback from the shoe sensors 42–47. The turret axis is adjusted such that the brush plane (a plane perpendicular to the brush axis of rotation and passing through the center of the brush) is perpendicular to the cement margin. The rock axis is adjusted such that the brush plane is essentially perpendicular to the plane of the shoe bottom.

During third and fourth phases, the transverse axis is started and operated such as to maintain a desirable rate of brushing (roughing) progress along the cement margin of the shoe. During these phases, the margin, turret, and rock axes continue to make adjustments as required to maintain the brush to shoe attitude relationships described above, using feedback from the shoe sensors. During the third, very brief, phase the depth axis is operated such as to bring the brush into contact with the shoe bottom. During the fourth phase, the depth axis is operated such that the amount of leather removed (roughing done) is controlled while traverse axis motion moves the area of brush contact along the cement margin of the shoe, as described above.

During a fifth phase, entered when the brush contact area has progressed to the first heel or toe curvature encountered in roughing the shoe, the rock axis feedback described above is attenuated, causing the rock axis to lock in position. The turret axis feedback, from the shoe sensing apparatus, described above is attenuated. The turret axis is then operated such as to maintain a desirable rate of brushing (roughing) progress along the cement margin. The margin axis is positioned such that the brush plane will maintain approximate perpendicularity with the cement margin. The depth axis continues to be operated the same as in the fourth phase described above.

During a sixth phase, entered when the brush contact area has completed the first heel or toe curvature encountered in roughing the shoe, control reverts to the same mode as the fourth phase, described above. There is one technical difference between the control modes of the fourth and sixth phases.

During a seventh phase, entered when the brush contact area has progressed to the second toe or heel curvature encountered in roughing the shoe, control reverts to the same mode as the fifth phase, described above.

During an eighth phase, entered when the brush contact area has completed the second heel or toe curvature encountered in roughing the shoe, control reverts to the same mode as the fourth phase described above.

During a ninth and very brief phase, entered when the contact area has completed the path around the cement margin of the shoe, the rock, traverse, margin and turret axes continue in the same control mode as in the fourth phase, described above. The depth axis is operated such that the brush is lifted from the shoe at a time and rate which cause final roughed area to overlap the beginning roughed area just enough to leave the amount of leather removed equal to and uniform with the rest of the roughed area.

During a tenth phase, entered when the brush is fully removed from the leather, all axes are driven to their appropriate home positions. Some further details are given in the next few paragraphs.

The direction of rotation of the shoe is immaterial to the operation of this roughing process. The point of brush entry assumed or implied by the automatic sequencing described above is for the purposes of explanation only. The point of brush entry is immaterial to the operation of the shoe roughing process. The margin axis is controlled, as described above, to maintain the margin of roughing coincident with the desired cement margin. Because the slope of the bottom of the shoe, as it intersects the brush plane, is variable, margin axis adjustments are compensated in response to shoe bottom attitude measurements from the shoe sensor. This compensation moves the chord of intersection between the brush and the shoe bottom relative to the brush rotational axis as required to maintain the margin of roughing coincident with the desired cement margin while roughing a uniformly wide path to uniform depth.

The depth axis is controlled, as described above, to affect the amount of leather removed. This control may be accomplished through such methods as: maintaining the position of the brush relative to the bottom of the shoe as indicated by the shoe sensor; maintaining constant the torque load imposed on its drive by the brush in proportion to the rate of progress of the brush contact area along the cement margin; maintaining constant the power consumed by the brush; maintaining the power consumed area along the cement margin; maintaining the force pressing the brush against the shoe bottom in proportion to the rate of progress of the brush contact area along the cement margin; maintaining the rate of production of removed (dust) particles constant; maintaining the rate of production of removed (dust) particles in proportion to the rate of progress of the brush contact area along the cement margin; or a combination of the above methods. The exact method used to accomplish control of the depth axis is important only to the extent that the axis is used in controlling the amount of material removed. The rotational velocity of the brush may be held constant or varied for purposes of controlling the amount of material removed and the quality of finish achieved.

An equalizer is used to accommodate different shoe sizes. The equatizer consists of a knob 83 that turns a screw 79 (FIG. 4) within the turret 48 to move elements 40 and 82 in FIG. 5 toward and away from one another. The screw 79 has left-and right-handed threads so that 40 and 82 move counter to one another. The equalizer maintains the assembly 104 on the machine centerline regardless of shoe length.

A few more matters are taken up in this paragraph. The servomotor 3 is at the rear of the machine 101 in FIG. 4; it acts through double pulleys (similar to 2A and 2B in FIG. 2) to drive a threaded shaft 80 which causes the arm 20 to pivot about the pivot 21 in the direction of the double arrow 111. Rotation of the turret 48 is effected by the motor 5 whose shaft 5A in FIG. 4 drives a right-angle gear within the turret. Rocking is achieved through pulleys 4A and 4B (driven by the motor 4), the latter of which drives a threaded shaft within the turret 48 causing the cradle support 51 in FIGS. 2 and 3 to tilt on arcuate ways 55A and 55B from the tilted position in FIG. 2 to that shown in FIG. 3. The rocking movement (see the arrow 107 in FIG. 5) is about a transverse axis of the footwear upper assembly 104, the transverse axis being between the toe portion and the heel portion of the footwear upper assembly. Translational motion of the assembly 104 is achieved by pulleys 6A and 6B (driven by the motor 6), the latter of which drives a threaded shaft 52A in FIGS. 2 and 3. The cradle support 51 rides in the plus and minus X-direction in FIG. 2 upon the threaded shaft 52A and a smooth shaft 52B. The labels 53 designate air pressure indicators and 54 designate air pressure regulators. Air is used among other places to tilt the previously mentioned cylindrical last pin 40A, also termed a clamping shaft, clockwise in FIG. 5, as above indicated. Air also drives the air cylindder 78 in FIG. 2; the cylinder 78 acts like a spring to press the sensor assemblage 49 onto the shoe upper assembly 104. The label 91 in FIGS. 1 and 2 is for a control panel containing an on-off switch, a DC adjustor for the DC motor 1, brush pressure, margin depth, and so forth. The roughing machine described herein uses mostly servomotor drives to perform prime-mover functions. It should be noted, however, that stepping motors may also be employed for that purpose and that air cylinders may also be used. The latter does introduce looseness of coupling into the system and is thus less positive than electric-motor drives.

Further modifications of the invention herein disclosed will occur to persons skilled in the art and all such modifications are deemed to be within the scope of the invention as defined by the appended claims.

What is claimed is:

1. A machine for automatically roughing the cement margin at the bottom of a footwear upper assembly, which cement margin is disposed along a closed path disposed near the edge between the bottom of the footwear upper assembly and the sides thereof, said closed path being irregular in direction along said closed path and irregular in contour, that comprises:

a support to receive the footwear assembly, which support is capable of rocking movement, translational movement and rotational movement;

drive means connected to drive the support to achieve said rocking movement, translational movement and rotational movement;

a roughing tool mounted to move relative to the footwear upper assembly and operable to achieve controllable roughing of the cement margin at a region of contact (or contact area) between the roughing tool and the cement margin as the cement margin moves relative to the roughing tool in the course of said rocking movement, translational movement and rotational movement; and sensing means to generate continuous electrical feedback signals to control the drive means which, on the basis of the feedback signals, acts to maintain, during a full cycle of roughing, a determined and substantially constant orientation between the roughing tool and the edge of the footwear upper assembly in the course of relative motion between the roughing tool and the upper assembly, said sensing means including a sensing mechanism to ride upon and apply downward pressure upon the cement margin in the course of said relative motion and operable to provide rocking signals which control the rocking movement of the upper assembly, and finger means disposed to contact and follow the side of the upper assembly to provide angular information, in the form of signals, with respect to horizontal orientation of the upper assembly relative to the roughing tool to permit control of said rotational movement, thereby to achieve said determined and substantially constant orientation, said rotational movement including angular indexing movement in the region between the toe portion of the upper assembly and the heel portion thereof, the combination of rocking movement, translational movement and rotational movement serving to maintain a substantially constant region of contact (or contact area) of the roughing tool with the cement margin along the closed path despite irregularities in the direction and contour of the cement margin to achieve a uniformly roughed margin.

2. A machine according to claim 1 in which the roughing tool is an electric motor driven rotatable brush in the form of a disc whose plane of rotation is substantially vertically oriented and whose periphery constitutes the region of contact with the cement margin and roughs the same in the course of said translational movement which is along a path that is maintained essentially orthogonal to the plane of rotation of the brush, said determined and substantially constant orientation being such that the edge of the upper assembly between the cement margin and the side of the upper assembly is maintained, in the course of said translational movement, by said rotational movement substantially orthogonal to said plane of rotation.

3. A machine for automatically roughing the cement margin of a footwear upper assembly, that comprises:
 a support to receive the footwear assembly, which support is capable of rocking movement, translational movement and rotational movement;
 drive means connected to drive the support to achieve said rocking movement, translational movement and rotational movement;
 a roughing tool mounted to move relative to the footwear assembly and operable to achieve roughing of the cement margin as the cement margin moves relative to the roughing tool in the course of said rocking movement, translational movement and rotational movement; and
 sensing means to provide feedback signals, acts to maintain a determined orientation between the roughing tool and the footwear upper assembly in the course of relative motion between the two, said sensing means including a sensing mechanism to ride upon and apply pressure upon the cement margin in the course of said relative motion and operable to provide rocking signals which control the rocking movement, and finger means disposed to contact and follow the side of the upper assembly to provide angular information, in the form of a signal, with respect to orientation of the upper assembly relative to the roughing tool to permit control of said rotational movement, thereby to achieve said determined orientation; said roughing tool being an electric motor driven rotatable brush in the form of a disc whose plane of rotation is substantially vertically oriented and whose periphery contacts the cement margin and roughs the same in the course of said translational movement which is along a path essentially orthogonal to the plane of rotation of the brush, said determined orientation along such that the edge of the upper between the cement margin and the side of the upper is maintained by said rotational movement substantially orthogonal to said plane of rotation;
 said roughing tool being an electric motor driven rotatable brush in the form of a disc whose plane of rotation is substantially vertically oriented and whose periphery contacts the cement margin and roughs the same in the course of said translational movement which is along a path essentially orthogonal to the plane of rotation of the brush, said determined orientation being such that the edge of the upper between the cement margin on the side of the upper assembly is maintained by said rotational movement substantially orthogonal to said plane of rotation;
 wherein said rotational movement is about a vertical yaw axis, wherein a roughing-tool drive is provided to effect movement of the roughing tool toward and away from the axis to control the region of contact between the brush periphery and the cement margin and the contact pressure therebetween, and wherein the sensing means includes a pair of fingers with a middle finger sensor disposed between the pair of fingers and adapted to follow along the side of the upper assembly adjacent to said edge to provide signals to control the position of said region of contact.

4. A machine for automatically roughing the cement margin of a footwear upper assembly, that comprises:
 a support to receive the footwear assembly, which support is capable of rocking movement, translational movement and rotational movement;
 drive means, including a yaw-drive motor, connected to drive the support to achieve said rocking movement, translational movement and rotational movement;
 a roughing tool mounted to move relative to the footwear upper assembly and operable to achieve roughing of the cement margin as the cement margin moves relative to the roughing tool in the course of said rocking movement, translational movement and rotational movement; and
 sensing means to provide feedback signals to control the drive means which, on the basis of the feedback signals, acts to maintain a determined orientation between the roughing tool and the footwear upper assembly in the course of relative motion between the two, said sensing means including a sensing mechanism to ride upon and apply pressure upon the cement margin in the course of said relative motion and operable to provide rocking signals which control the rocking movement, and finger means disposed to contact and follow the side of the upper assembly to provide angular information, in the form of a signal, with respect to orientation of the upper assembly to provide angular information, relative to the roughing tool to permit control of said rotational movement, thereby to achieve said determined orientation;
 in which the roughing tool is an electric motor driven rotatable brush in the form of a disc whose plane of rotation is substantially vertically oriented and whose periphery contacts the cement margin and roughs the same in the course of said translational movement which is along a path essentially orthogonal to the plane of rotation of the brush, said determined orientation being such that the edge of the upper between the cement margin and the side of the upper assembly is maintained by said rotational movement substantially orthogonal to said plane of rotation;

wherein rotation is effected through 360 degrees in one direction to complete roughing of one footwear upper assembly and is reversed for 360 degrees rotation to complete roughing of the next footwear upper assembly, thereby to even wear of the roughing tool, to apply consistent roughing to both the left and the right footwear of a pair, and to eliminate the need for slip rings for the yaw-drive servomotor.

5. A machine according to claim 1 in which the sensing means provides signals to maintain said region of contact is positioned slightly inward and away from said edge to assure that roughing does not occur at the side of the upper.

6. A machine for automatically roughing the cement margin of a footwear upper assembly, that comprises:
a support to receive the footwear assembly, which support is capable of rocking movement, translational movement and rotational movement;
drive means connected to drive the support to achieve said rocking movement, translational movement and rotational movement;
a roughing tool mounted to move relative to the roughing tool in the course of said rotational movement; and
sensing means to provide feedback signals to control the drive means which, on the basis of feedback signals, acts to maintain a determined orientation between the roughing tool and the footwear upper assembly in the course of relative motion between the two, said sensing means including a sensing mechanism to ride upon and apply pressure upon the cement margin in the course of said relative motion and operable to provide rocking signals which control and follow the side of the upper assembly to provide signals angular information, in the form of a signal, with respect to orientation of the upper assembly relative to the roughing tool to permit control said rotational movement, thereby to achieve said determined orientation;
in which the sensing means provides signals to maintain said region of contact is positioned slightly inward and away from said edge to assure that roughing does not occur at the side of the upper;
in which said sensing mechanism comprises rollers that follow undulations in the cement margin in the course of said translational movement, and in which the sensing means is an assemblage that includes the sensing mechanism and the finger means, which assemblage is free to rotate through a limited angle about its longitudinal axis and provides signals on the basis of the angular position of the assemblage to control said rocking movement.

7. A machine according to claim 6 in which the longitudinal axis of the assemblage is disposed at an acute angle to the plane of said translational movement and in which said finger means comprise a pair of fingers and a middle finger therebetween oriented substantially parallel to the longitudinal axis and hence, also at an acute angle to said plane, said pair of fingers being operable to provide a differential signal indicative of orientation.

8. A machine according to claim 7 in which each of the sensing mechanism, each finger of the pair of fingers and the middle finger is individually connected to a potentiometer and which includes an electrical controller connected to receive electrical signals from the potentiometer, which serve as control signals for the drive means.

9. A machine according to claim 8 in which the drive means comprises a rocking-movement servomotor, a translational-movement servomotor and a rotational-movement servomotor all activated by the electrical controller.

10. A machine according to claim 9 wherein the roughing tool is mounted to pitch about a pivot point toward and away from the cement margin and that further includes a servomotor to rock the tool under the control of the electrical controller on the basis of feedback control signals from the sensing mechanism.

11. A machine according to claim 10 wherein the roughing tool also is adapted to move transversely with respect to the cement margin and that includes a servomotor to move the roughing tool transversely under the control of the electrical controller on the basis of feedback control signals from the sensing mechanism.

12. A machine according to claim 11 wherein at least some of the control signals to the electrical controller to control pitch of the roughing tool emanate from said sensing mechanism.

13. A machine according to claim 12 wherein signals to control translational positioning of the roughing tool emanate from said middle finger sensor.

14. A machine according to claim 6 in which the rollers are adapted further to follow any crown in the footwear assembly bottom to provide a signal that is used to adjust the position of the brush transversely onto the assembly bottom thereby to maintain the edge of the footwear upper assembly away from the portion being roughed.

15. A machine according to claim 1 having an equalizer mechanism to maintain proper positioning of the footwear upper assembly relative to the roughing tool to compensate for size differences in footwear upper assemblies roughed on the machine.

16. A machine according to claim 15 wherein the equalizing mechanism comprises a threaded shaft having threads at each end, thereof, the threads at one end being opposite hand to the threads at the other end, and a heel rest disposed to move in response to threads at one end in one direction and a toe rest disposed to move in response to threads at the other end in a direction 180 degrees or opposite to said one direction.

17. A machine according to claim 1 in which, at the toe end and the heel end of the assembly the rocking signals are rendered inactive.

18. A machine for automatically roughing the cement margin of footwear assembly, that comprises:
a support to receive the footwear assembly, which support is capable or rocking movement, translational movement and rotational movement;
drive means connected to drive the support to achieve said rocking movement, translational movement and rotational movement;
a roughing tool mounted to move relative to the footwear upper assembly and operable to achieve roughing of the cement margin as the cement margin moves relative to the roughing tool in the course of said rocking movement, translational movement and rotational movement; and sensing means to provide feedback signals to control the drive means which, on the basis of the feedback signals, acts to maintain a determined orientation between the roughing tool and the footwear upper assembly in the course of relative motion between the two, said sensing means including a sensing mechanism to ride upon and apply pressure upon the cement margin in the course of said relative motion and operable to provide rocking signals which control the rocking movement, and finger means disposed to contact and follow the side of the upper assembly to provide angular information, in the form of a signal, with respect to orientation of the upper assembly relative to the roughing tool to permit control of said rotational movement, thereby to achieve said determined orientation;

in which said sensing mechanism comprises fingers and a pair of roller sets, one roller set being disposed on each side of the roughing tool and in close proximity to the roughing tool, in which the longitudinal axis of the roller sets is at an acute angle to the fingers so that, during roughing, the edge of the upper assembly is received within the acute angle thus formed and the portion of the upper assembly comprising the cement margin and the side of the upper assembly is wedged between the roller sets and the fingers.

19. A machine according to claim 18 wherein the combination of movements, that is, said rocking movement, translational movement and rotational movement, serves to effect relative motion between the bottom of the footwear assembly and the roughing tool to move the margin being roughed continuously past the roughing portion of the roughing tool, wherein the sensing means serves to permit presentation of a substantially constant or uniform surface to-be-roughed to the roughing tool along the path of the cement margin and serves as well to assure roughing of the margin at proper transverse locations and substantially uniformly disposed inwardly transversely disposed locations from the edge of the upper assembly.

20. A machine according to claim 19 wherein the roughing tool is a roughing wheel and that includes a variable-speed motor to drive the roughing wheel, said roughing wheel being mounted to achieve pivot motion toward and away from the cement margin in the course of said combination of movements, as well as transverse motion toward and away from the upper assembly, which machine includes discrete motor drives to achieve pivoting motion of the roughing wheel, all on the basis of feedback signals from the sensing means.

21. A machine according to claim 20 wherein the sensing means include a middle finger disposed between the pair of fingers and disposed essentially parallel to the pairs of fingers, which middle finger provides signals that serve to control, at least in part, transverse movement of the roughing wheel.

22. A machine according to claim 20 wherein the support is a turret whose drive means is an electric motor, wherein said discrete motor drives are electric motors and wherein the sensing means comprises a plurality potentiometers each of which receives a mechanical input from one of the roller sets, the pair of fingers and the middle finger to achieve position control of relative positioning between the roughing wheel and the margin of the footwear upper.

23. A method of roughing the cement margin of a footwear upper that comprises:

supporting the footwear upper assembly by a mechanism capable of applying to the upper assembly rocking movement, translational movement and rotational movement;

applying a rotating roughing tool to the cement margin;

applying a combination of said rocking movement, translational movement and rotational movement to the upper assembly while simultaneously effecting roughing of the cement margin by the roughing tool, which combination of movement serves continuously to present a new roughing surface to the roughing tool in the course of roughing and, hence, results in uniformity of roughing, said combination of movement serving, as well, to cause the roughing tool to track the cement margin as the cement margin moves past the roughing periphery of the roughing tool to prevent the roughing tool from roughing the side of the upper assembly; and providing a follower mechanism to supply feedback signals that control said combination of movement as well as to achieve positional control of the roughing tool, which follower mechanism comprises rollers that follow the undulations of the cement margin and fingers that follow the contour of the side of the upper assembly, the longitudinal axis of the rollers being at an acute angle to the longitudinal axis of the fingers so that, during roughing, the edge of the upper assembly is received within the acute angle thus formed so that the portion of the upper assembly comprising the cement margin and the side is wedged between the rollers and the fingers so that, in the course of roughing, the rollers do not slip over the edge onto the side of the upper assembly and the fingers do not slip over the edge onto the cement margin, whereby the roughing tool is caused to track the cement margin truly in the course of roughing.

24. A method of roughing the cement margin at the bottom of a footwear upper assembly, which cement margin is disposed slightly inward from the edge between the bottom and the sides of the footwear upper assembly along a closed path whose length is a full cycle of movement of the footwear upper assembly in the course of a roughing cycle, said closed path being irregular in both direction and contour, that comprises:

supporting the footwear upper assembly by a mechanism capable of applying to the upper assembly rocking movement, translational movement and rotational movement in the course of said full cycle;

applying a roughing tool to the cement margin to effect roughing thereof along said closed path; and applying a combination of said rocking movement, translational movement and rotational movement to the upper assembly while simultaneously effecting roughing of the cement margin by the roughing tool, which combination of movements serves continuously to present a new roughing surface to the roughing tool in the course of roughing, said combination of movements serving, as well, to cause the roughing tool to track the cement margin as the cement margin moves past the roughing portion of the roughing tool in a way that maintains a determined and constant orientation between the roughing tool and the path of the cement margin to provide an essentially constant contact area between the roughing portion of the roughing tool and the roughing surface of the cement margin and, hence, to result in uniformity of roughing, said rotational movement including angular indexing movement of the footwear upper assembly during roughing in the region between the toe portion and the heel portion thereof to maintain said determined and constant orientation despite direction changes of the cement margin between said toe portion and said heel portion.

25. A method of roughing the cement margin at the bottom of a footwear upper assembly, that comprises:
supporting the footwear upper assembly by a mechanism capable of applying to the upper assembly rocking movement, translational movement and rotational movement;
applying a roughing tool to the cement margin to effect roughing thereof; and
applying a combination of said rocking movement, translational movement and rotational movement to the upper assembly while simultaneously effecting roughing of the cement margin by the roughing tool, which combination of movements serve continuously to present a new roughing surface to the roughing tool in the course of roughing as well as to present an essentially constant contact area between the roughing portion of the roughing tool and the cement margin in the course of roughing and, hence, results in uniformity of roughing, said rotational movement serving to cause the roughing tool to track the cement margin in a determined orientation therebetween as the cement margin moves past the roughing portion of the roughing tool, said rotational movement including angular indexing movement of the upper portion thereof to maintain the determined orientation substantially constant despite direction changes of the cement margin between said toe portion and said heel portion.

26. Apparatus for roughing the cement margin of a footwear upper assembly, that comprises:
means for supporting a footwear upper assembly by a mechanism capable of applying to the upper assembly rocking movement, translational movement and rotational movement;
means for roughing the cement margin; and
means for effecting a combination of said rocking movement, translational movement and rotational movement to the upper assembly while simultaneously effecting roughing of the cement margin by the means for roughing, which combination of movements serves continuously to present a new roughing surface to the means for roughing in the course of roughing to present an essentially constant contact area between the means for roughing and the cement margin in the course of roughing and, hence, results in uniformity of roughing, said rotational movement serving to cause the means for roughing to continuously track the cement margin with a determined orientation therebetween as the cement margin moves past the roughing portion of the means for roughing, wherein said rotational movement includes angular indexing movement of the upper assembly in the course of roughing in the region between the toe portion and the heel portion of the upper assembly to maintain the determined orientation substantially constant despite direction changes of the cement margin between said toe portion and said heel portion said rocking movement being about a transverse axis of the footwear upper assembly between the toe portion and the heel portion of the footwear upper assembly.

27. Apparatus according to claim 26 in which said means for roughing is a roughing tool having a region of contact between the tool and the margin in which said rocking movement serves to maintain the cement margin being roughed at all times essentially parallel to said region of contact.

28. Apparatus according to claim 27 in which the cement margin is a closed path near the edge of the footwear upper assembly between the cement margin and the sides of the upper assembly adjacent thereof, the length of the path being that traversed by the roughing tool during one full cycle of roughing, said path having a width d and being maintained by the combination of movements an essentially fixed minimum space e between the outer edge of the cement margin and the edge of the upper assembly between the cement margin and the sides of the upper assembly adjacent thereto.

29. Apparatus according to claim 27 in which the means for supporting the footwear upper assembly includes a cradle support on arcuate ways to permit tilting of the cradle support to achieve the rocking movement.

30. Apparatus according to claim 26 in which the means for roughing is a disc-shaped wire wheel positioned such that the brush plane maintains approximate perpendicularly with the cement margin in the course of roughing by virtue of the combination of movements.

31. Apparatus according to claim 26 in which the determined orientation is one wherein the brush plane is maintained essentially perpendicular to the edge of the footwear assembly, which edge is between the cement margin and the sides of the upper assembly, and in which the means for effecting the combination of movement effects said angular indexing movement to maintain the brush plane essentially perpendicular to said edge.

* * * * *